Oct. 23, 1956 R. J. HARKENRIDER 2,768,035
SHAFT LUBRICATOR
Filed Nov. 13, 1953 3 Sheets-Sheet 1

INVENTOR.
Robert J. Harkenrider
BY
Mann, Brown and Hansmann
Attys.

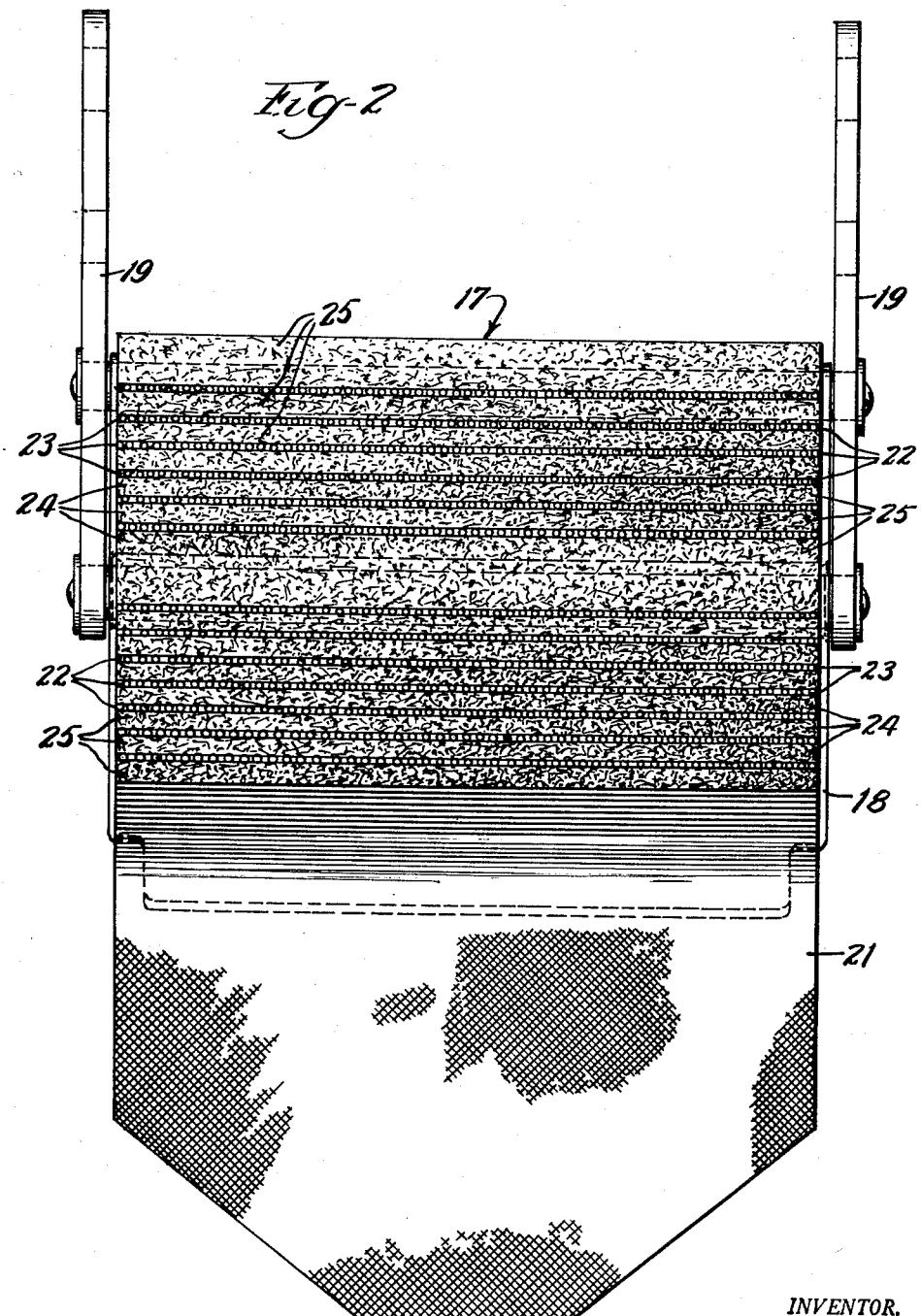

Oct. 23, 1956 R. J. HARKENRIDER 2,768,035
SHAFT LUBRICATOR
Filed Nov. 13, 1953 3 Sheets-Sheet 3
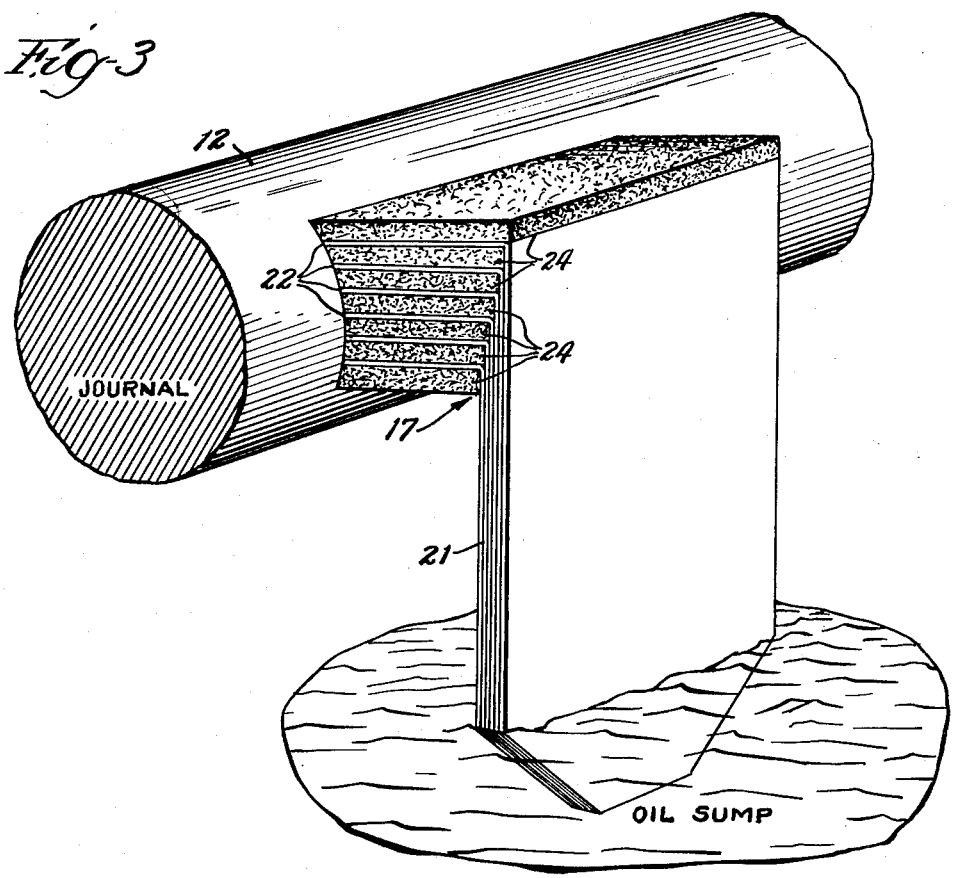
INVENTOR.
Robert J. Harkenrider
BY
Marny, Brown and Hansmann
Attys.

United States Patent Office 2,768,035
Patented Oct. 23, 1956

2,768,035

SHAFT LUBRICATOR

Robert J. Harkenrider, Winona, Minn., assignor to Gladys D. Miller, Winona, Minn.

Application November 13, 1953, Serial No. 391,864

2 Claims. (Cl. 308—132)

This invention relates to shaft lubricators, and particularly lubricators for traction motor suspension bearings of diesel locomotives.

The principal objects of the invention are to increase the height of oil lift and to provide storage of oil ready for application to a shaft for lubrication immediately after a period of rest.

Generally speaking, this is accomplished by providing threads, yarns, or rovings of high capillary action, rising from an oil supply to a height adjacent to the surface to be lubricated and turning laterally to present end portions to that surface and flanking the laterally turned portions with absorbent pads to collect excess oil from the surface lubricated and store it for further application.

Further objects and advantages of the invention will appear as the disclosure proceeds and the description is read in connection with the accompanying drawings, in which:

Fig. 2 is an elevation of the lubricator looking at it from the side of the shaft to be lubricated; and Fig. 3 is a perspective view of the lubricator fabric, a shaft, and an oil sump.

Figure 1:
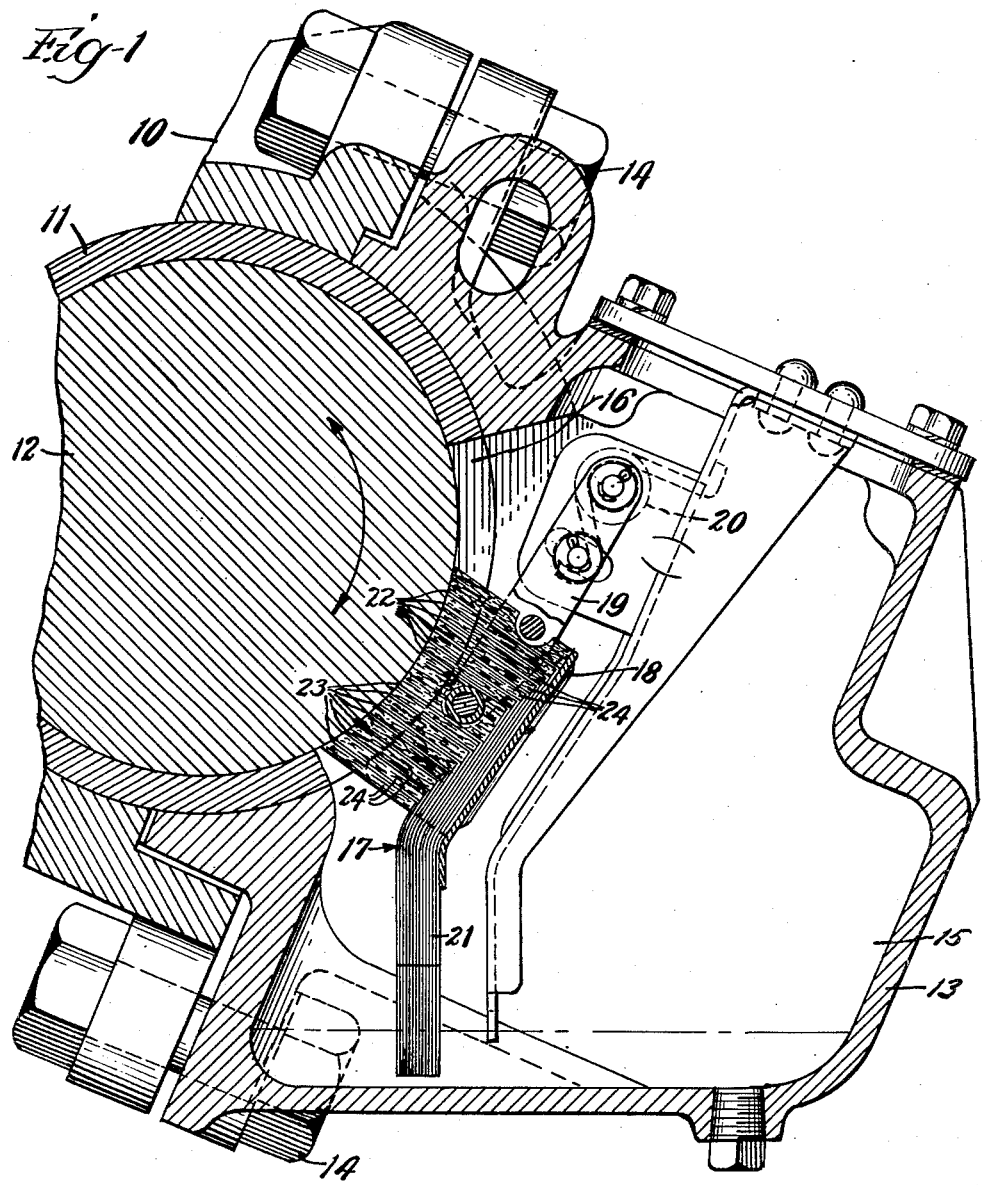
Fig. 1 is a side elevation of a lubricator for a traction motor suspension bearing, parts of the fittings being shown in section to reveal the structure of the fabric body.

But these diagrammatic drawings and the corresponding description are used for the purpose of disclosure only.

In Fig. 1, the reference numeral 10 indicates a familiar form of traction motor suspension bearing provided with a liner or shell 11 forming the actual bearing for the wheeled axle 12. Associated with these is a motor suspension bearing cap or axle cap 13 secured to the motor suspension bearing by bolts 14 and provided with an oil reservoir 15.

The means forming the subject matter of this invention is to lift oil from the reservoir 15 and apply it to the axle 12 through the window opening 16 in the shell or liner 11.

That function is performed by a high-lift wick and storage fabric or assembly generally indicated by 17 in a holder 18 pivoted to levers 19 and urged toward the axle by springs 20, substantially as disclosed in my Patent No. 2,640,742, June 2, 1953, the disclosure of which is incorporated herein by reference in the interests of brevity.

According to this invention, the high-lift wick and storage fabric or assembly 17 is made of layers of cloth, yarn, or rovings, or a mixture of them, suitably fastened or bound together in a flexible wick 21 with their upper portions 22 turned laterally and presenting end portions 23 of the threads, yarns, or rovings to the shaft surface to be lubricated for delivering oil thereto, and flanked by absorbent pads 24 of felt or other storage material, also presenting surfaces 25 in wiping relation to the surface of the shaft 12 to collect and store excess oil during a period of operation and reapply that oil after a period of rest.

The lubricator presents an arcuate surface to the journal, this surface being an arc of a circle having a radius equal to that of the journal, as shown in Figure 1, and for convenience will be deemed to have an axis which is coincident with the axis of the journal.

The pads and flanked portions of the cloth, yarn, or rovings are sewed or otherwise fastened or bound together in a stack for action on the shaft.

The threads, yarns, or rovings raise the oil by capillary action, and the end portions which are wiped by the rotating shaft feed the oil to it. Being in layers or in lines parallel to the axis of the shaft, they feed a uniform film of oil onto the shaft. The wiping of the rotating shaft promotes continued capillary action that amounts to pumping. With multiple sheets or layers so feeding oil during the period of operation, as a run of a locomotive, an excess of oil is applied to the shaft, and the excess is largely removed by and stored in the pads 24 until they become saturated or substantially as wet as the cloth.

During a period of rest, the lift of oil or the flow to the shaft ceases, but the capillary material and the pads remain wet. When the shaft rotates again, a copious film of oil is immediately supplied by the ends 23 of the threads, yarns, or rovings, and the surfaces 25 of the pad to lubricate the bearing surfaces which may become pretty dry during rest.

The felt pads are connected to the oil sump indirectly by means of the cloth, yarn, or rovings, and the intermediary of the rotating shaft. The major portion of the oil absorbed in the pads remains there during a period of rest. It does not flow to the intermediate layers of threads, yarns, or rovings to any considerable extent. It may be this is so because the lifting portion of the fabric is wetter and holds more oil at the delivery height than does the material of the pads.

The fabric lubricator embodying this invention uses less felt than in traction motor lubricators now in common use, and delivers a more uniform film of oil to the shaft. It delivers a more uniform quantity of oil for a given change of level in the reservoir. Thus, the embodiments of the invention are superior to prior lubricators regardless of the height to which the oil must be lifted.

However, the invention is especially advantageous where a high lift is required, on the order of 10 inches in 48 hours at 70 degrees for a standard electric car oil.

Cotton, viscose, rayon, nylon, vicara in cloth or yarn or rovings are preferred for the high-lift portion of assembly 17, because of the high capillary action contributing to the high and rapid lift of the oil.

For the pads, coarse all wool felt, $\frac{1}{16}''$ to $\frac{1}{4}''$ thick, is preferable, but other types of felt, combinations of felt, and absorbers made of synthetic and natural fibers may be used. Generally speaking, anything that will wipe excess oil from the shaft, store it, and reapply it may be used.

The lifting is done entirely by the cloth, yarn, or rovings, and the primary application is by the ends of the threads, yarns, or rovings being wiped by the shaft; and they are preferably in lines or layers, and separated slightly from each other.

The storing is done in the main by the pads, which have no path by which they can drain back to the oil sump during a period of rest.

For convenience in manufacture, cloth is preferable to bundles of thread, yarn, or rovings for the high-lift portion of the lubricator. Horizontal threads in cloth do not help in lifting oil, but assist in transferring oil to the storage felt.

In one form that has been found eminently satisfactory, the cloth is cut on a bias of substantially 45 degrees to the warp and woof. This bias cut of the high-lift cloth is of great practical significance because it leaves no warp or woof threads of the fabric parallel to, or substantially parallel to, the journal-contacting portion of the wick. Experience has taught that when threads of the cloth are permitted to parallel the axis of the journal, the normal wear of the pad will sooner or later release small pieces of the fabric material and result in waste grabs.

The essential feature seems to be the high lift capillary material running from the bottom to the ends being wiped by the shaft and flanked by the storage pads.

Cloth substantially as coarse as burlap is preferable.

Viscose and rayon are familiar cellulose products available from a variety of sources. Nylon is a synthetic protein plastic made from a reaction of adipic acid and hexamethylene diamine, supplied by E. I. duPont de Nemours & Co. Vicara is a protein plastic, a product of Virginia-Carolina Chemical Corporation.

I claim:

1. In a lubricator for a rotatable journal including a body portion having an arcuate surface of substantially less than 180° for contact with a limited circumferential area of the journal, and a depending portion forming a wick to supply the arcuate surface with lubricant, the improvement wherein at least said body portion of the lubricator is formed of layers of felt and a woven fabric bound together, said fabric having warp and woof strands of high lift characteristics with the weave of the fabric being so oriented or biased with respect to said arcuate surface that all warp and woof strands of the fabric which intersect said arcuate surface are at a substantial angle thereto, said layers being disposed generally parallel to the axis of said arcuate surface and terminating at said arcuate surface with at least portions of the exposed fabric layers in said arcuate surface extending across the entire width of the lubricator.

2. In a lubricator for a rotatable journal including a body portion having an arcuate surface of substantially less than 180° for contact with a limited circumferential area of the journal, and a depending portion forming a wick to supply the arcuate surface with lubricant, the improvement wherein at least said body portion of the lubricator is formed of layers of felt and a woven fabric bound together, said fabric having warp and woof strands of high lift characteristics with the weave of the fabric being so oriented or biased with respect to said arcuate surface that all warp and woof strands of the fabric which intersect said arcuate surface are at a substantial angle thereto, said layers being disposed generally parallel to the axis of said arcuate surface and terminating at said arcuate surface with the fabric layers intersecting said arcuate surface in spaced rows, each of which extend across substantially the entire width of the lubricator.

References Cited in the file of this patent

UNITED STATES PATENTS

| | | |
|---|---|---|
| 403,448 | Saunders | May 14, 1889 |
| 2,047,730 | Fleckenstein | July 14, 1936 |
| 2,540,829 | Miller | Feb. 6, 1951 |
| 2,708,611 | Harkenrider | May 17, 1955 |